(12) United States Patent
Fuselier et al.

(10) Patent No.: US 7,620,621 B2
(45) Date of Patent: Nov. 17, 2009

(54) METHODS AND SYSTEM FOR PROVIDING CONTEXT SENSITIVE INFORMATION

(75) Inventors: Christopher Scott Fuselier, Farmington, CT (US); John James Dougherty, Collegeville, PA (US); Joseph John Fisher, Austin, TX (US); Thomas A. Digate, Fort Wayne, IN (US); Richard Alan Carpenter, Charlottesville, VA (US); Bernardo Anger, Westborough, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,574

(22) Filed: May 1, 2001

(65) Prior Publication Data
US 2006/0184508 A1   Aug. 17, 2006

(51) Int. Cl.
G06F 17/30 (2006.01)
G06F 7/00 (2006.01)
(52) U.S. Cl. .......................... 707/3; 707/10
(58) Field of Classification Search .................. 707/10, 707/3
See application file for complete search history.

(56) References Cited

U.S. PATENT DOCUMENTS

| | | | |
|---|---|---|---|
| 5,317,507 A | 5/1994 | Gallant et al. | 364/419 |
| 5,659,736 A | 8/1997 | Hasegawa et al. | 395/611 |
| 5,675,745 A | 10/1997 | Oku et al. | 395/207 |
| 5,717,923 A | 2/1998 | Dedrick | 395/613 |
| 5,778,370 A | 7/1998 | Emerson et al. | 707/100 |
| 5,819,284 A | 10/1998 | Farber et al. | 707/104 |
| 5,873,076 A | 2/1999 | Barr et al. | |
| 5,899,991 A | 5/1999 | Karch | 707/5 |
| 6,018,742 A | 1/2000 | Herbert | 707/102 |
| 6,029,165 A | 2/2000 | Gable et al. | 707/3 |
| 6,073,170 A | 6/2000 | Sumita et al. | 709/218 |
| 6,076,082 A | 6/2000 | Kindo | 706/12 |
| 6,085,201 A | 7/2000 | Tso et al. | 707/505 |
| 6,092,091 A | 7/2000 | Sumita et al. | 707/530 |
| 6,182,067 B1 | 1/2001 | Presnell et al. | 707/5 |
| 6,295,502 B1 | 9/2001 | Hancock et al. | |
| 6,446,035 B1 | 9/2002 | Grefenstette et al. | |
| 6,502,091 B1 | 12/2002 | Chundi et al. | |
| 6,594,654 B1 * | 7/2003 | Salam et al. | 707/3 |
| 6,650,346 B1 | 11/2003 | Jaeger et al. | |
| 6,704,739 B2 | 3/2004 | Craft et al. | |
| 6,779,042 B1 * | 8/2004 | Kloba et al. | 709/248 |
| 6,834,276 B1 * | 12/2004 | Jensen et al. | 707/2 |
| 6,915,294 B1 | 7/2005 | Singh et al. | |
| 7,089,236 B1 | 8/2006 | Stibel | |
| 7,096,218 B2 | 8/2006 | Schirmer et al. | |
| 7,181,438 B1 * | 2/2007 | Szabo | 707/2 |
| 2002/0091568 A1 * | 7/2002 | Kraft et al. | 705/14 |

FOREIGN PATENT DOCUMENTS

| | | | |
|---|---|---|---|
| EP | 270360 | 8/1988 | 15/40 |
| EP | 1016991 | 5/2000 | 17/30 |
| EP | 999502 | 10/2000 | 17/30 |
| JP | 8305729 | 11/1996 | 17/30 |

(Continued)

OTHER PUBLICATIONS

RD 287009, Mar. 1988.
RD 287005, Mar. 1988.

*Primary Examiner*—Kuen S Lu
(74) *Attorney, Agent, or Firm*—Armstrong Teasdale LLP

(57) ABSTRACT

A method and system are described for providing context sensitive data to a system user. The method includes the steps of identifying the user and querying databases to create a user context. Information is aggregated from the network databases and filtered using the user context. Providing the correct data needed by the user for that particular time, location and job function.

25 Claims, 12 Drawing Sheets

FOREIGN PATENT DOCUMENTS

| | | | | |
|---|---|---|---|---|
| JP | 9245049 | 9/1997 | .................... | 17/30 |
| JP | 11053383 | 2/1999 | .................... | 17/30 |
| JP | 11053392 | 2/1999 | .................... | 17/30 |
| JP | 11110401 | 4/1999 | .................... | 17/30 |
| JP | 11195034 | 7/1999 | .................... | 17/30 |
| JP | 2000105766 | 4/2000 | .................... | 17/30 |
| JP | 2000123016 | 4/2000 | .................... | 17/30 |
| SE | 9900958 | 3/1999 | .................... | 17/30 |
| WO | WO 9944152 A2 | 9/1999 | | |
| WO | WO 0008568 | 2/2000 | | |

\* cited by examiner

METHODS AND SYSTEM FOR PROVIDING CONTEXT SENSITIVE INFORMATION

COPYRIGHT STATEMENT

A portion of the disclosure of this patent document contains material which is subject to copyright protection. The copyright owner authorizes reproduction for purposes of of the patent document or the patent disclosure, as it appears in the Patent and Trademark Office patent file or records, but otherwise reserves all copyright rights whatsoever.

FIELD OF THE INVENTION

The present invention relates to a method and system for providing context sensitive information to a user, more particularly to a system which provides context sensitive information based on the current user context, including current location, and schedule.

BACKGROUND OF THE INVENTION

Large business organizations utilize a variety of computer and software systems to manage their operations. Such systems are typically designed to focus on a particular sector of the operation, such as finance, inventory control or manufacturing routing. The development of systems to solve particular needs often results in users having to consult a number of distinct systems to gather the information needed to make business decisions. To compound the problem, data is often managed by "legacy" systems or otherwise older computer systems and architectures. These systems typically utilize older technology and are often difficult to integrate with newer enterprise systems.

To effectively manage a business, operations data needs to be up to date and readily available so decisions can be made quickly. A number of solutions have been proposed which translate data between a variety of databases. These solutions often allow for the querying of multiple disparate databases. While these solutions allow the interrogation of multiple databases, they often require complicated queries that have disadvantages of being difficult to use and modify by average business users. Additionally, these systems typically require the user to "drill down" through multiple layers of data if the user requires lower level information. For example, determining the inventory level for a particular manufacturing facility. This often results in an overload of data for the user, further complicating the decision making process.

These solutions also tend to be restricted to a limited portion of the business" computer network and thus not available when the user is away from the office, or does not have access to a networked computer.

Accordingly, it is considered advantageous to have a system that can quickly provide critical business data to a user independent of their location. It is further considered advantageous to provide a system which filters this data to provide the data that is most relevant to the users present location.

SUMMARY OF INVENTION

It is therefore advantageous to provide a method and a system for carrying out the method which provides context sensitive information to a user. The method comprises the steps of identifying a user. Defining a query and transmitting the query and user identity to a server. Periodically querying at least one database. Retrieving the query information from the at least one database and retrieving user information from the at least one database. A subset of the query information is created depending on said user information and transmitted to the user.

Additionally, the method and system can provide information to predefined zones within a facility. Once a user is detected within a zone, the method and system aggregates data requested by the user and applies a user context to provide a context sensitive information report.

Another advantage of the invention is that the method and system in response to a user request provide a means for identifying qualified personnel within a business. The method and system will provide the requesting user with the information, or alternatively contact the identified qualified personnel and aggregate their responses.

DETAILED DESCRIPTION

Figure 1:
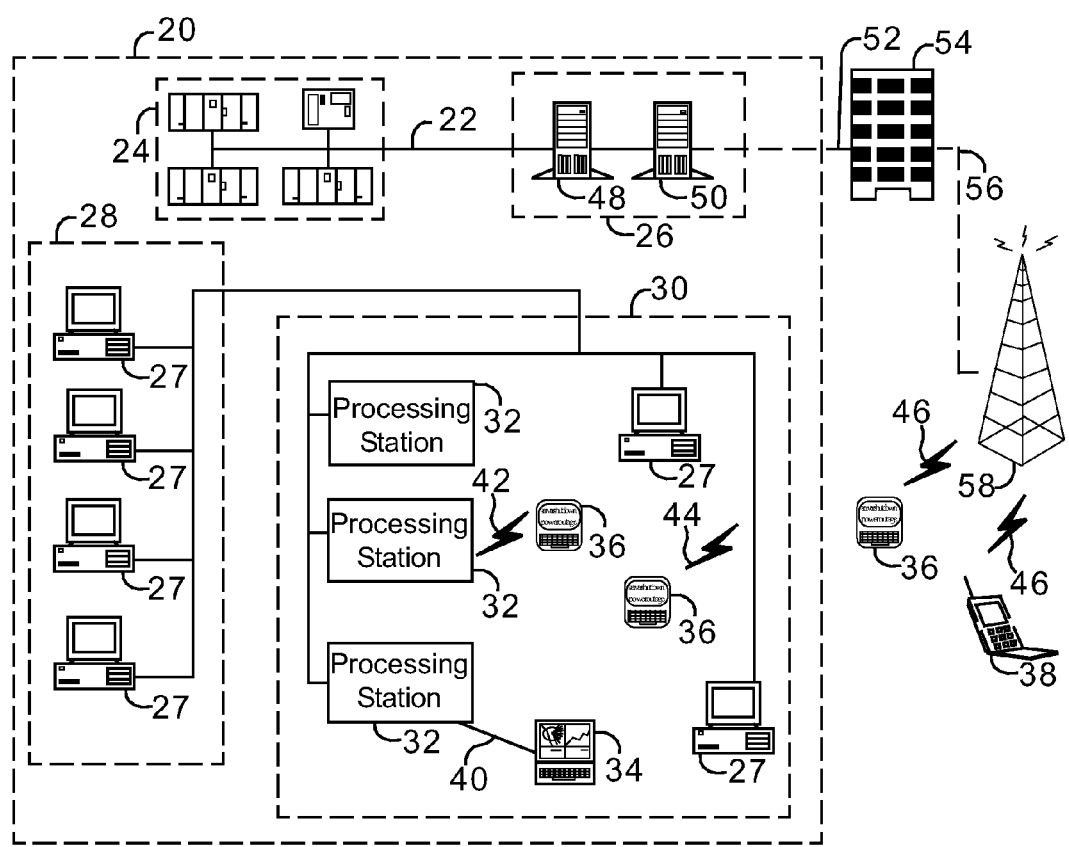
FIG. 1 illustrates a schematic view of a network of the invention.

Large business operations utilize computer networks to manage the flow of information. These networks often connect various systems which monitor and collect information on various aspects of the business operation. Referring to FIG. 1, a typical business operation 20 is shown. The business 20 has a network 22 which connects legacy systems 24 and servers 26 to a plurality of computer nodes. The computer nodes include, but are not limited to desktop computers or clients 27 in the offices 28 and manufacturing facilities 30. Typically, various manufacturing processing stations 32 also connect to the network 22 to provide real time or summary data on the status of the processing station 32.

In addition to the desktop clients 27, the business 20 may also utilize other portable computing nodes such as, but not limited to, laptop computers 34, personal digital assistants 36, or cellular phones 38. As will be described in more detail herein, these devices 34-38 may connect to the network 22 through both traditional wired connections 40 or wireless connections 42-46.

A number of network servers 26 are utilized in the operation of the network 22. Two typical servers include an application and data type server 48 and a gateway or firewall server 50. The application and data type server 48 serves the clients 27 software applications and provides a centralized storage of data. It should be noted that while a single server 48 is represented here, there may be any number of servers 48 utilized by a business 20 to maximize the efficiency and reliability of the network 22. The second server, the firewall server 50, connects the network 22 to computer networks 52 external to the business 20. An example of an external network 52 would be the internet. The firewall server 50 is a security device which controls access to the computer network 22 from the external network 52.

As will be described in more detail herein, the external network 52 connects the network 22 to an external wireless service provider 54. The provider 52 contains its own network 56 which allows it to transmit signals 46 from a transmitter 58 to a wireless device 36, 38. The transmitter utilized by the provider 54 may be of a number of different types, for example, cellular, radio, microwave or infrared. The transmitter 58 does not have be land bound as depicted in FIG. 1., but may be located in space (e.g. a satellite) as well.

Figure 2:
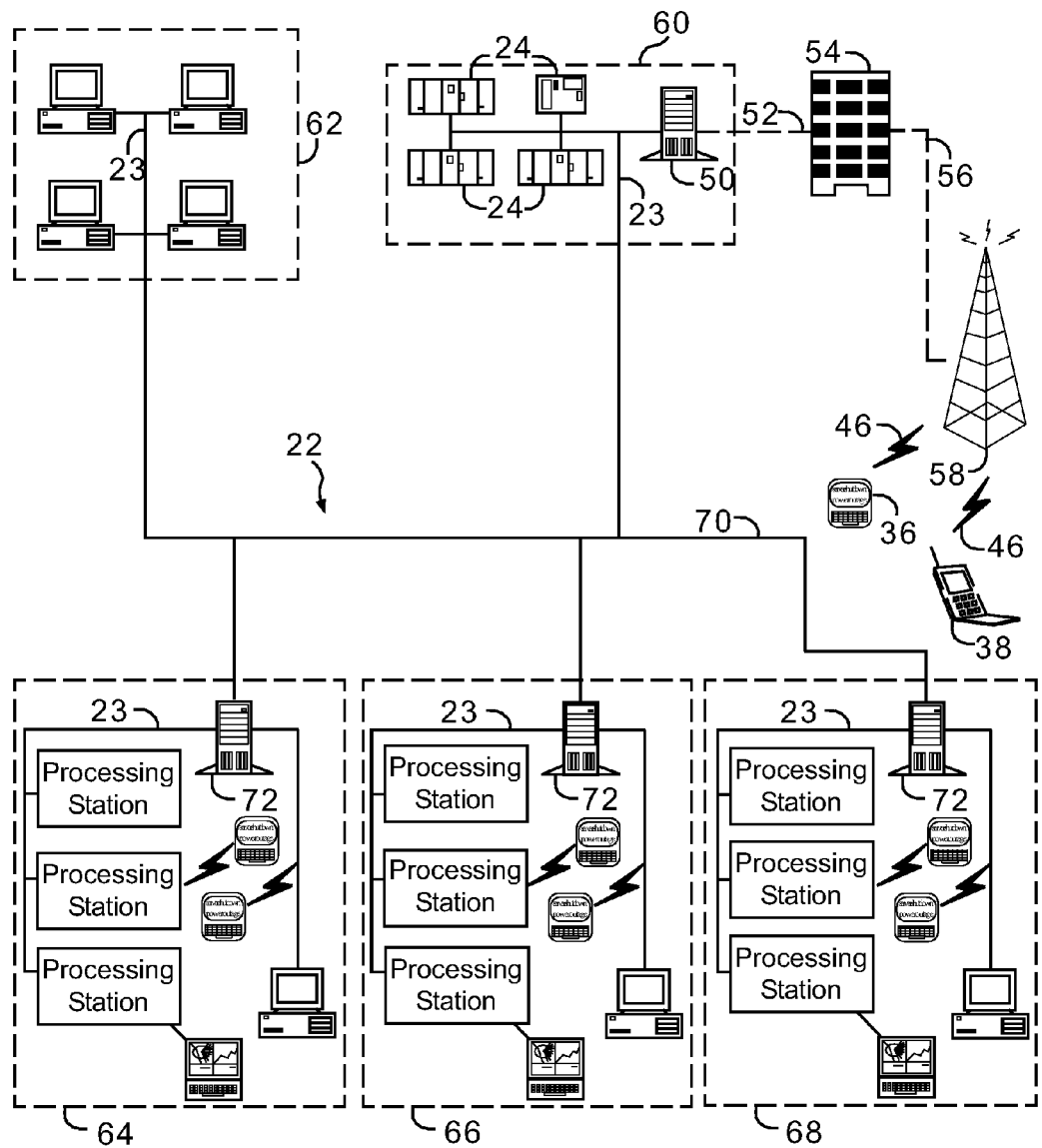
FIG. 2 illustrates a schematic view a multi-site network of the invention.

Typically, in a large multinational company, the business 20 will be larger than a single installation. Referring to FIG. 2, the business 20 includes a plurality of facilities 60-68. These facilities may include, but are not limited to, a datacenter 60, a corporate office 62, and a plurality of manufacturing facilities 64-68. Each of the facilities 60-68 will typically have local area networks 23 which are connected together by a wide area network 70 to form the network 22. Each of the local networks 23 will typically have servers 72 which provide applications and data storage to the local facilities 60-68. As with a single site business, a firewall server 50 connects the network 22 with an external computer network 52.

Figure 3:
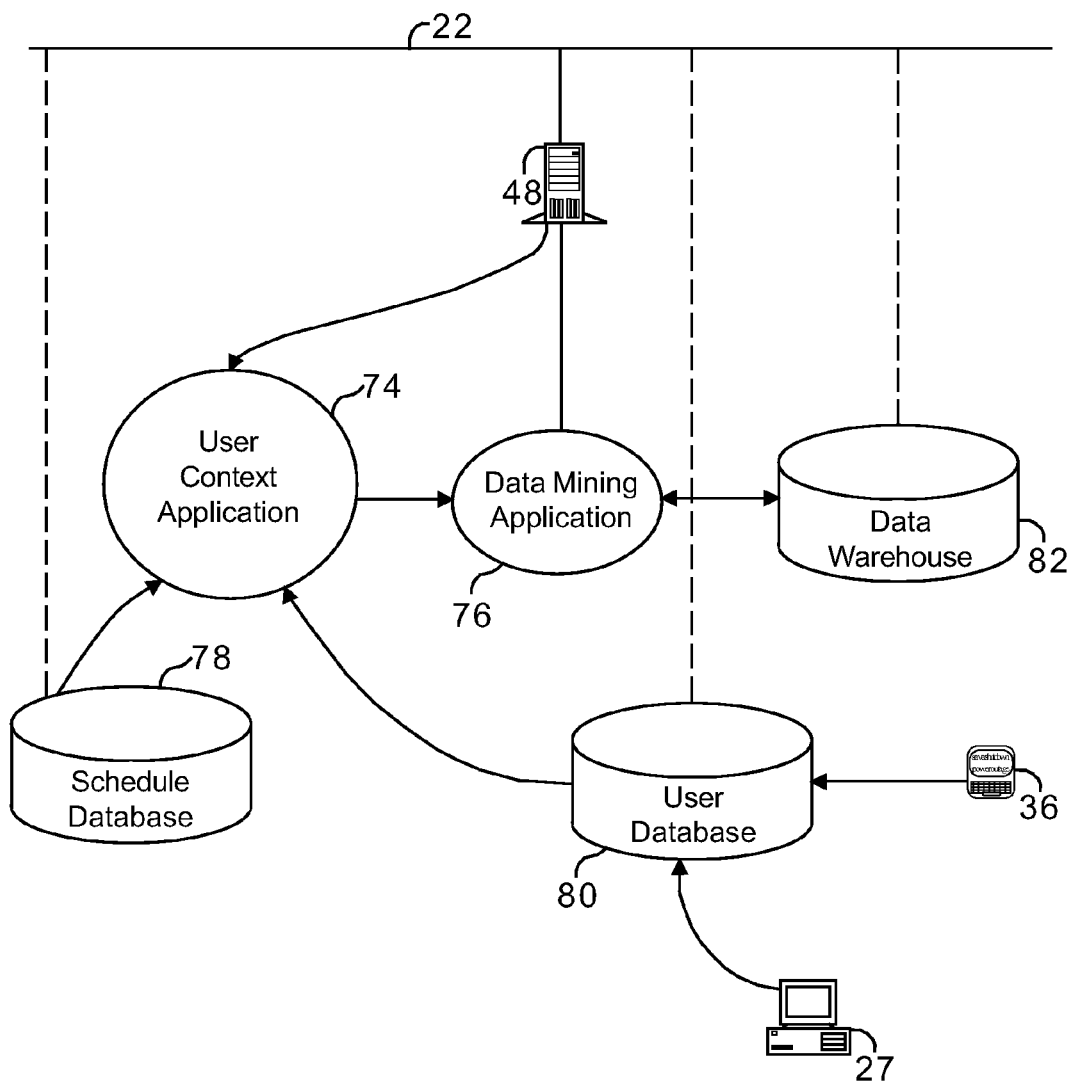
FIG. 3 is a schematic view of the invention.

To effectively manage the business 20, operations data must be effectively and rapidly collected and reported if it is going to be used in the decision making process. Referring to FIG. 3, in accordance with the exemplary embodiment of the invention, a User Context Application 74 operates on a network server 48. This application 74 cooperates with a Data Mining Application 76 and a variety of databases 78, 80 to provide context sensitive data to a system user through the network 22. The databases 78, 80 contain information on the system user and include, but are not limited to, a schedule database 78 which stores information on the system user's daily appointment schedule and a user database 80 which includes personnel information (e.g. job assignment, team affiliations) and user preferences. The Data Mining Application 76 queries various business information databases 82 to acquire aggregate the necessary business data required by the system user.

The databases 78-82 are connected and accessible through the network 22. Additionally, the User database 80 may be accessed by any computing device, including the client 27 or a wireless device 36.

As will be described in more detail herein, the User Context Application 74 provides context sensitive information in response to a request from a system user. For purposes herein, the request may be either predefined (e.g. send me this data every day) or dynamic (e.g. send me this data now). The context sensitive information is a filtered form of the aggregate information compiled by the Data Mining Application 76. The User Context Application 74 applies rules defined by the user to the aggregated information to take into account the system users current context. The user context includes, but is not limited to the following user parameters; 1) current physical location, 2) current time of day, 3) current week, month and year, 4) current job assignment, 5) current schedule and 6) current preferences.

Figure 4A:
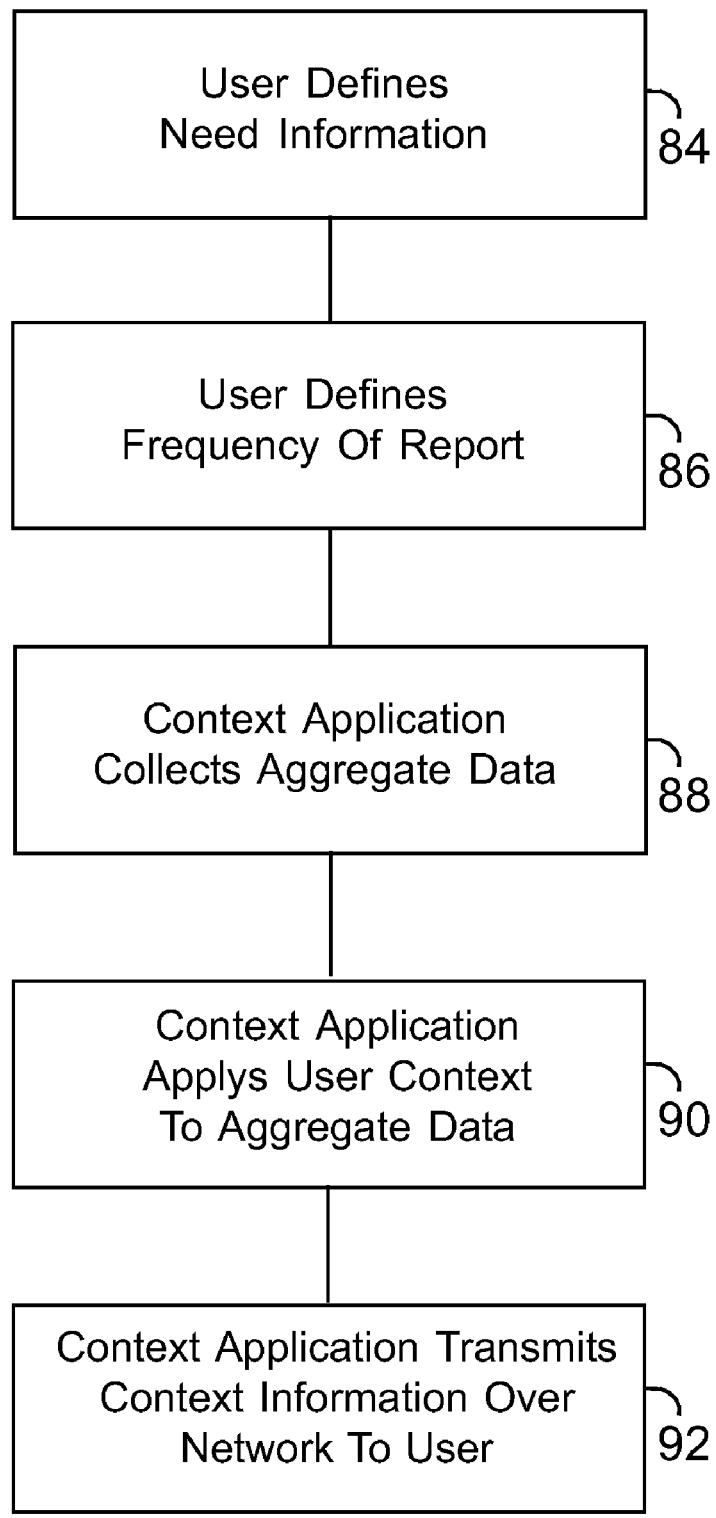
FIG. 4A is a flowchart depicting the operation of one embodiment of the invention.

A simple example is illustrated in the flowchart shown in FIG. 4A. First, the system user defines what information they need 84 and how often they want the data aggregated 86. For example, the CEO of business 20 is concerned about the level of inventory in the business and requests that the inventory information be aggregated daily. Since inventory is of a concern, the CEO also defines for the system an inventory level (e.g. number of product, monetary value, etc.) which if exceeded, would generate an alert. The context application 74 collects 88 the aggregated data from the data mining application 76. The context application then applies the user context 90 to the aggregate data. Using the example above, the context application determines that the CEO is currently located in manufacturing facility 66 (FIG. 2), that it is 9:00 am local time, the CEO is scheduled to meet with the plant manager at 9:30 and that the CEO prefers the data be presented in a "gage" type format. Thus, when the context application 74 applies the user context to the requested information, a report will be constructed and transmitted 92 to the CEO showing the inventory data for the current day in manufacturing facility 66.

Figure 4B:
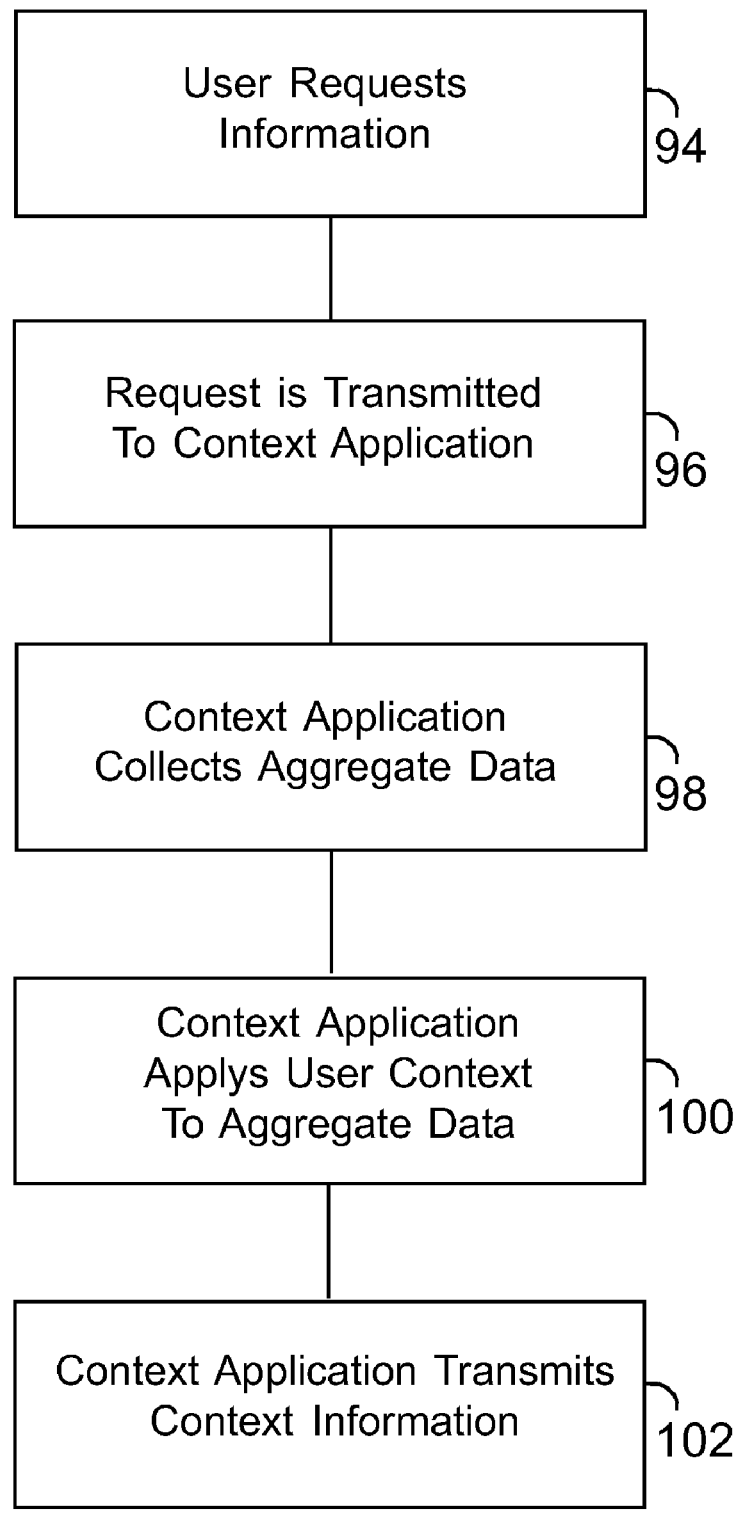
FIG. 4B is a flowchart depicting the operation of an embodiment of the invention.

An alternate embodiment of this process is shown in FIG. 4B. In this embodiment, a request 94 is made dynamically for a particular set of information. The request is transmitted 96 over the network 22 to the context application 74. The context application collects 98 the aggregate data from the data mining application 76 and applies the user context 100 to the aggregate data. In this embodiment, the identity of the requesting user may serve as both a security feature and a filter since it allows the data to be refined for that users job function. For example, different inventory data may be reported to a manufacturing engineer who works on a particular product line, than the business 20 CEO who is concerned about all the product lines. Once the context data has been created, it is transmitted 102 back to the requesting user. It is important to note that in both embodiments, if the requesting user desires to see a higher or lower level of information (e.g. CEO wants to compare manufacturing facility 66 with the other facilities), system allows the user to "drill up" or "drill-down" through the data.

Figure 5:
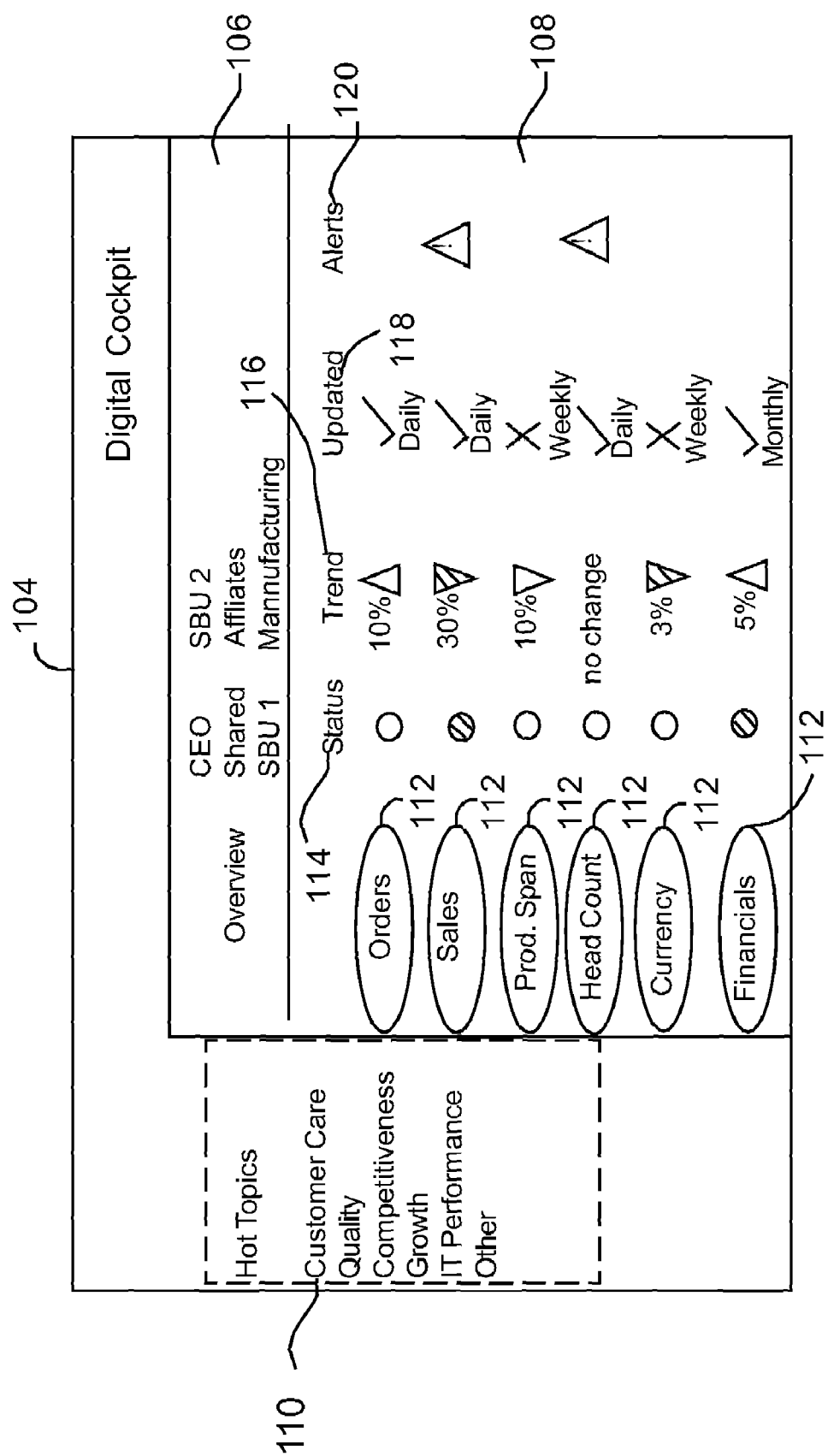
FIG. 5 is a view of one embodiment of a report displayed by the invention.
Figure 6:
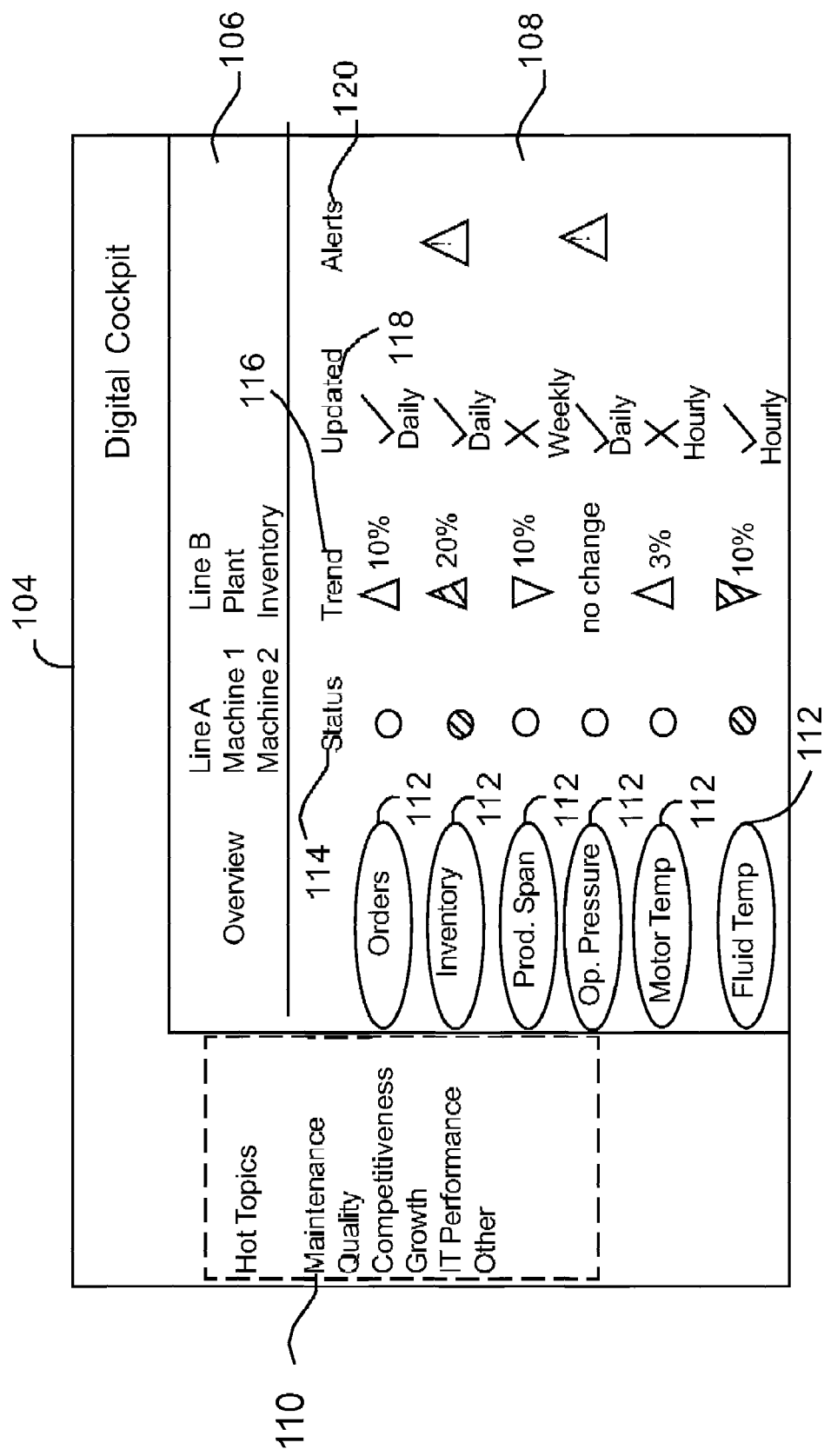
FIG. 6 is a view of another embodiment of the report illustrated in FIG. 5.
Figure 8:
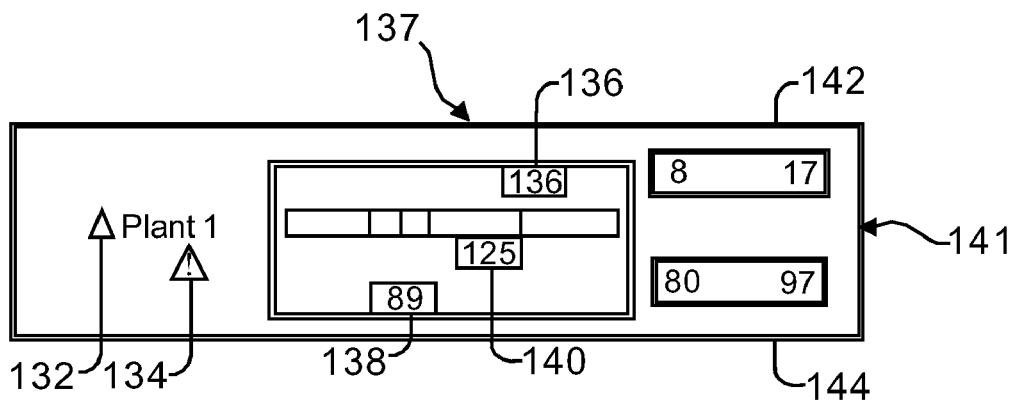
FIG. 8 is a detailed view of a portion of the report illustrated in FIG. 7.

FIGS. 5 8 illustrate different context reports as displayed on either the client 27 or one of the wireless devices 36-38. The report 104 (FIG. 5-6) shows the user information on a particular manufacturing process or product line. The report is sub-divided into a number of regions. A menu section 106, a report section 108 and a metrics section 110.

The menu section 106 allows the user to drill-up or drill-down through related data. By clicking on one of a series of hyperlinked titles, the user can switch to different related datasets. Alternatively, the user can review summary overview information, for example, for an entire plant.

The metrics section 110 provides the user with a set of hyperlinks to topics of interest. In the exemplary embodiment, the topics would be parameters being monitored by the business 20, for example, quality level, growth, performance. These parameters may be predefined by a system administrator or customized by the user.

The report section 108 provides the context summary information in the user preferred format. As shown in FIG. 5, for each of the measured parameters 112 (orders, inventory, temperature, etc.) a summary of the data related to the parameter 112 is displayed. In the example illustrated in FIGS. 5 & 6, the data is summarized into four fields, Status 114, Trend 116, Updated 118 and Alerts 120. Each of the fields 114-120 graphically displays an indication representative of the data for a particular measured parameter 112. In the exemplary embodiment, the Status field 114 represents the current status of the parameter 112 with respect to the operating plan. The Trend field 116 indicates direction the of the parameter, whether it is increasing, decreasing or staying flat. The Updated field 118 shows the user the defined update period, and the graphical display indicates if the data has been updated (e.g. a check mark) or not (an "X" mark) since the last time the data has been reviewed. The final field, Alert field 120, displays a graphical symbol when certain criteria are met as described herein above. It should be noted that more or less fields can be added to the report section as needed or desired by the user or business 20.

Figure 7:
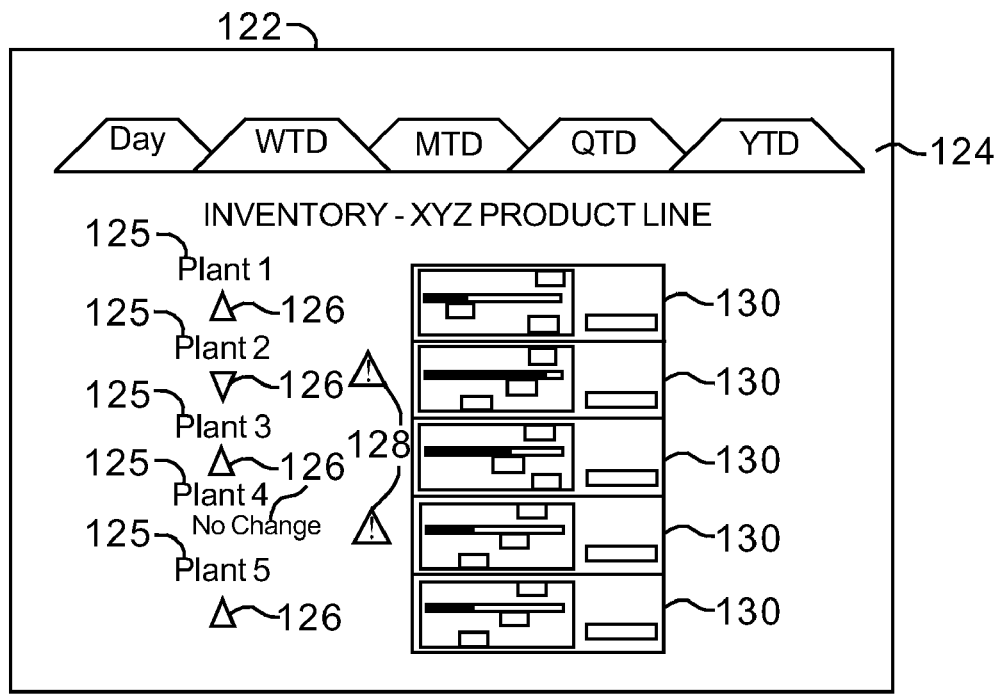
FIG. 7 is a view of another report displayed by the invention.

After reviewing the reports section 108, the user can click on the parameter to gain access to more detail on the particular parameter 112. As illustrated in FIG. 7, the user clicked on the "inventory" parameter 112. The detailed display 122 allows information on the inventory parameter to be viewed at different levels. A tab section 124 allows changes to the period of time over which the data is summarized, in the exemplary embodiment, this would include day, week to date (WTD), month to data (MTD), quarter to date (QTD) and year to date (YTD). For the time period chosen, the data is summarized as defined by the user preference. As shown in FIG. 7, the inventory for a product is shown for each plant 125 where it is manufactured. For each plant, a trend indicator 126, an alert indicator 128, and a "gage" or graph 130 is shown for each plant 125.

By clicking a particular plant 125, further detailed information can be accessed as shown in FIG. 8. Detailed information on the plant 125 could include further trend indicators 132 and alert indicators 134. A detail section 137 provides comparison data for the time period selected (e.g. day, week to date, month to date, quarter to date or year to date), including the daily average 236, daily average for the previous year 138 and the planned daily average 140. A third summary section 141 includes information comparing the actual level vs. plan level 142 and a comparison projecting the level total for the entire year (based on current trends) vs. plan level 144.

Figure 9:
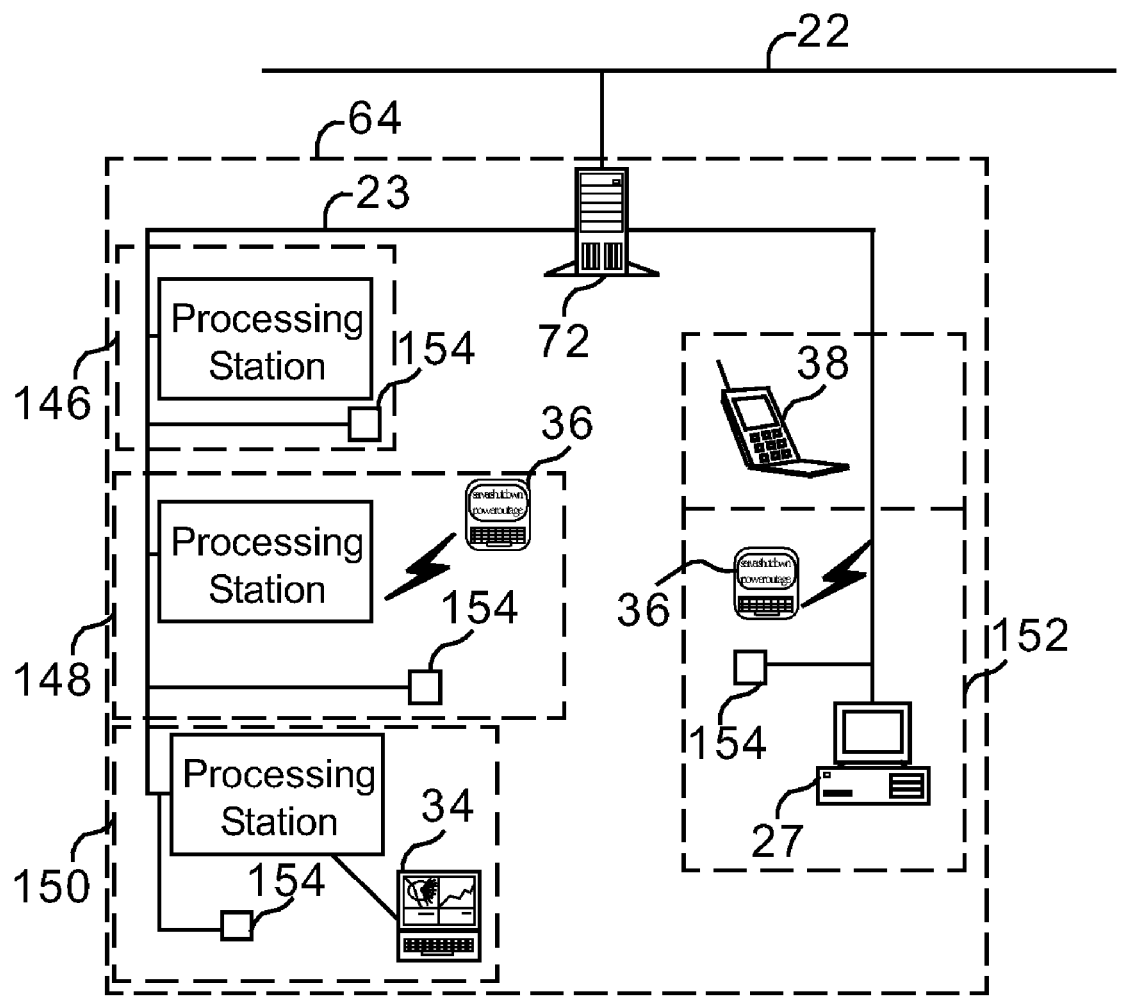
FIG. 9 illustrates a schematic view of the network of one of the facilities in FIG. 2.

An alternate embodiment of this system is shown in FIG. 9. In this embodiment, the facility 64 is divided into discreet zones 146 152. The zones 146-152 are areas of common interest. For example, in a manufacturing facility zones 146, 148, 150 are each an individual manufacturing processes or assembly lines. Alternate zones include, but are not limited to, areas 152 such as engineering, shipping and receiving or the data center. The zones 146-152 are defined by positioning devices or sensors 154 which detect devices, these devices include, but are not limited to device such as a handheld personal digital assistant 36, a laptop computer 34, cellular phone 38 or a client computer 27. Once the location and user are known, the User Context Application 74 residing on the server 72 can provide context sensitive information to the user that is particular to that zone.

Figure 10:
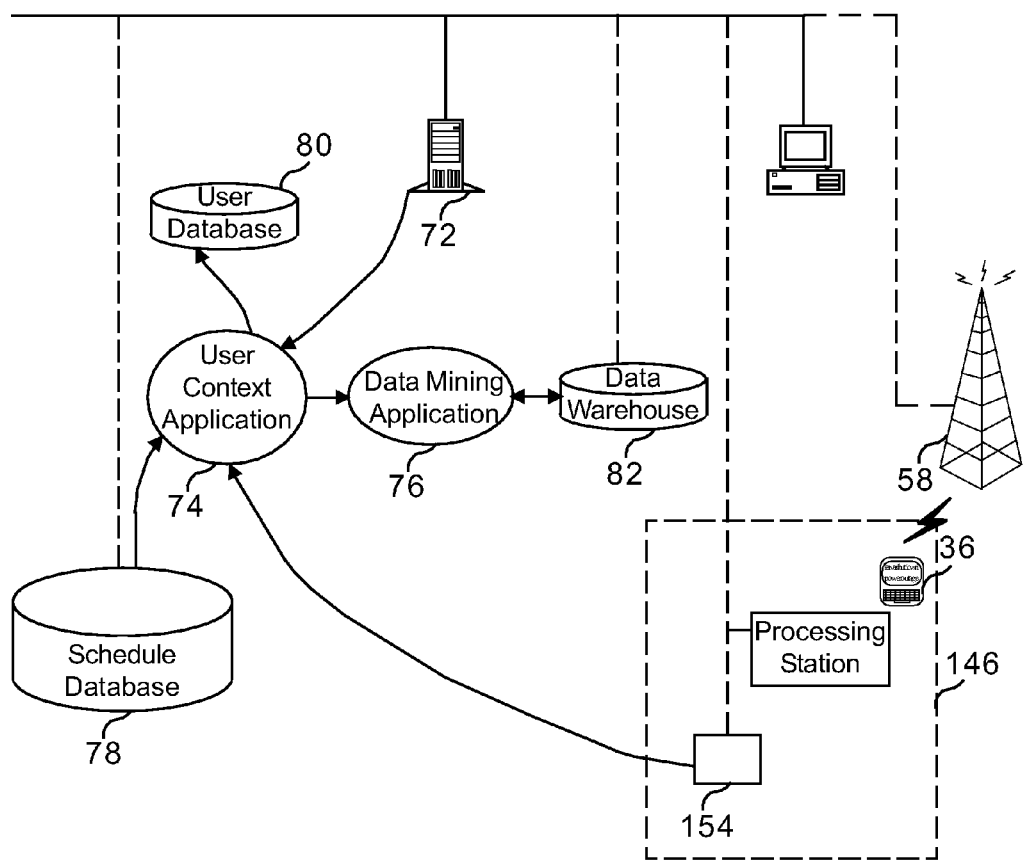
FIG. 10 illustrates a schematic view of one embodiment of the invention illustrated in FIG. 9.

An example of this embodiment is shown in FIG. 10. An operator approaches a quality inspection station 146 in the plant 64. The sensor 154 detects her presence and signals the User Context Application 74. The User Context Application 74 queries the User Database 80, determines the users job function, current assignment and preferences. The Data Mining Application 76 aggregates data on that inspection station 146 from the database 82. A context sensitive report is transmitted to the wireless device 36. The report maybe include, for example, information on the quality of the products inspected at the station 146. The report may also include an inspection approval sheet that is digitally signed and approved. If desired, the system also could be used to activate or deactive controls at the inspection station 146 depending on the identify of the user. Additionally, the wireless device 36 may include authentication functionality (e.g. password, fingerprint, voice recognition) that provides additional security.

While a cellular or radio wireless device is illustrated in FIG. 10, it is contemplated that other wireless network technologies could also be used such as the BlueTooth wireless network standard or via an infrared.

An alternative to the sensor 27 would be using the Global Positioning System or GPS device in each of the devices used by the system user. In this embodiment, the zones 146-152 would be created virtually within the server 72 with the zone boundaries being defined by the GPS coordinates of the zone. It is contemplated that the portable user devices 34, 36 would transmit their coordinates to the server 72. When the device 34, 36 moves into a zone 146-152 the system could then apply the appropriate user context information for that user in that particular zone.

Figure 11:
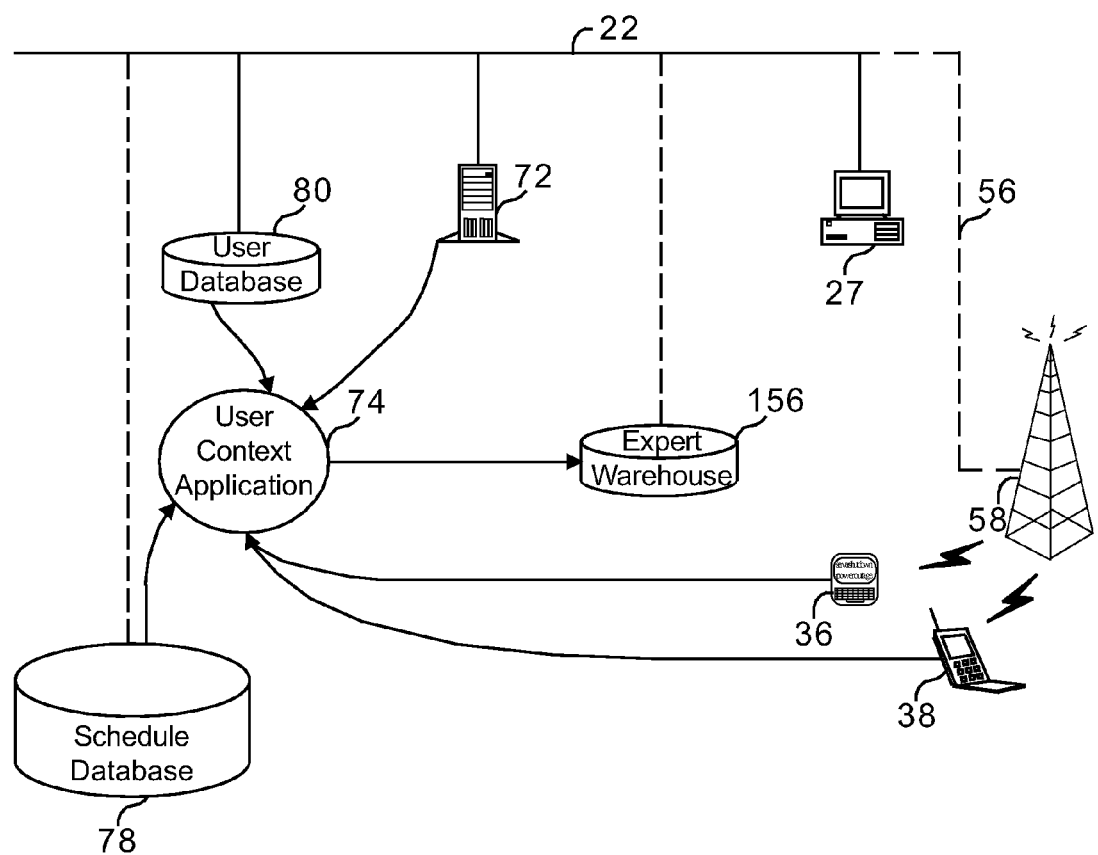
FIG. 11 illustrates a schematic view of another embodiment of the invention.
Figure 12:
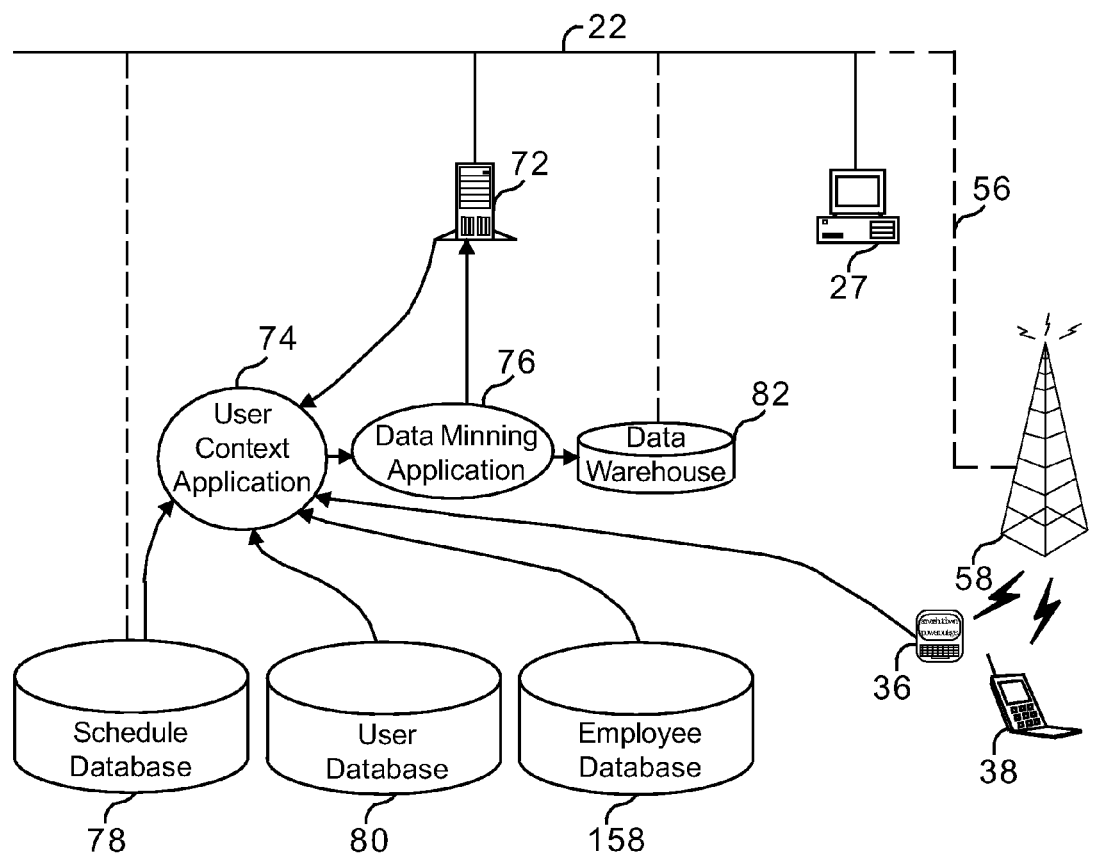
FIG. 12 illustrates a schematic view of another embodiment of the invention.

The embodiments described herein above utilize the User Context Application 74 to provide context sensitive business data. Another alternate embodiment is illustrated in FIG. 11. In this embodiment, the user has a problem and needs to identify and locate the appropriate experts within the business. The user transmits via their computing device 36, 38 (either wireless as illustrated or via a traditional client 27) a command to the User Context Application 74 requesting information on a particular topic. The User Context Application queries the User Database 80 to ascertain the user context of the user and then queries a Expert Database to determine the appropriate business employees have an expertise related to that topic. The creation and operation of the expert database is described in U.S. patent application Ser. No. 09/711,711 entitled "Methods and Systems for Accessing Experts" which is incorporated herein by reference.

The user context is applied to the returned list of experts to filter out experts that may not be relevant to the particular user. The context sensitive expert list with contact information is then forwarded to the user. Alternately, the user Context Application 74 can contact the list of identified experts with a request for information. The message sent to the identified experts may also include information on the location and identity of the requesting user. The User Context Application 74 would collect the responses from the identified experts and forward the aggregated responses to the user. Additional uses for this technique include the identification and location of service specialists, product sales, or other qualified personnel.

In the case of large corporations, the list of experts could be large. In this case, it is contemplated that the User Context Application would send a list of Expert Communities or groups of experts that may have information pertaining to the user's information request. The User in turn would select the Community they feel is most appropriate and transmit the data back to the User Context Application 74 for further identification of experts or other qualified personnel.

Since some wireless devices may have limited graphical capabilities or display size. Another embodiment of the invention utilizes a predetermined set of commands created by the system administrator or the device user. In this embodiment, the user enters a command followed by a field of information. The command and field are transmitted to the User Context Application 74 for processing. The User Context Application then parses the command from the field and executes a predetermined action depending on the command. Since the User Context Application has access to the user context, the resulting set of data or information can be reduced to that considered most relevant to the user at the time the command was transmitted. For example, if the user is traveling from an airport to a facility and needs to contact "John Smith" at the facility. The user uses her cellular phone 38 or personal digital assistant 36 to send a command "PH: Smithjohn" to the User Context Application 74. The User Context Application 74 queries the business" Employee Database 158 to determine the phone number for all employees named "John Smith". Depending on the user's preferences, the User Context Application 74 will return a list of phone numbers to the user's cellular phone 38. If desired, the user can have the User Context Application 74 return a list of all employees with that name, or more preferably, have the User Context Application apply a user context taking into account the user's schedule to filter the list of names to only those "John Smith's" located at the facility which the user is traveling to. The User Context Application 74 can further help the user by prioritizing the list of contact using criteria such as job function, team assignment or department. This embodiment of using a command and a field can be applied to any report desired by the user. Other examples include financial reports, system status, product line information or any other report that is defined in the system.

While the embodiments describes herein above discuss the transmitting of a request or command to the User Context Application 74. The system can also executed via an electronic mail. The User Context Application 74 would then be located at a predetermined electronic mail address. The user would transmit an electronic mail containing the information described herein above which would then be sent to the User Context Application 74 via an electronic mail server. Information would then be transmitted back to the user by electronic mail. The electronic mail server may or may not be located on the same server as the User Context Application 74. The use of electronic mail provides the advantage of integrating the User Context Application into an existing network 22 with a minimal effort.

As described above, the present invention can be embodied in the form of computer implemented processes and apparatuses for practicing those processes. The present invention can also be embodied in the form of computer program code containing instructions embodied in tangible media, such as floppy diskettes, CD-ROM's, hard drives, or any other computer-readable storage medium, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium (embodied in the form of a propagated signal propagated over a propagation medium, with the signal containing the instructions embodied therein), such as over electrical wiring or cabling, through fiber optics, or via electromagnetic radiation, wherein, when the computer code is loaded into an executed by a computer, the computer becomes an apparatus for practicing the invention. When implemented on a general-purpose microprocessor, the computer program code segments configure the microprocessor to create specific logic circuits.

While the invention has been described in terms of various specific embodiments, those skilled in the art will recognize that the invention can be practiced with modification within the spirit and scope of the claims.

The invention claimed is:

1. A method for providing context sensitive information comprising:

identifying a user associated with a business operation;
defining a query related to the business operation;
defining an alarm criteria for the query information;
periodically querying at least one database;
retrieving query information from the at least one database;
comparing the query information to the alarm criteria;
retrieving user information from the at least one database in response to the querying;
obtaining a location of the user within a facility, the location of the user related to the user's duties within the business operation;
creating a context sensitive subset of the query information based on the user information and the location of the user within the facility, the query information related to the user's duties within the business operation;
transmitting at least one of the context sensitive subset query information to the user; and
notifying the user if the alarm criteria is met.

2. The method of claim 1 wherein the query definition includes data on a desired format of the information.

3. The method of claim 1 wherein the query definition includes data on a desired format of the information.

4. The method of claim 1 wherein the query definition includes information on a period of time between the queries.

5. The method of claim 1 further comprising the step of:
defining an alarm criteria for the query information;
periodically querying the at least one database;
comparing the query information to the alarm criteria; and,
notifying the user if the alarm criteria is met.

6. A system for providing context sensitive information to a user, said system comprising:
a server;
at least one database connected to said server;
a query means for executing a predefined query on said at least one database, said query means creating a set of data that is related to a business operation, said query means configured to periodically query said at least one database;
a means for a user to request said set of data from said server, the user associated with the business operation;
an application program on said server, said application program determining the identity of the user, obtaining a location of the user within a facility, and creating a context sensitive subset of said set of data based on the users identity and the location of the user within the facility, the location of the user and said context sensitive subset of said set of data related to the user's duties within the business operation, said application program configured to retrieve query information from said at least one database; and
a means for transmitting one or more of said context sensitive subset of said set of data and a notification if predetermined alarm criteria is met to the user.

7. The system of claim 6 wherein said application program creates said context sensitive data subset from a set of rules predefined by the user.

8. The system of claim 6 further comprising at least one node accessible by the user and remote from said server.

9. The system of claim 8 wherein said at least one node is a computer.

10. The system of claim 8 wherein said at least one node is a personal digital assistant.

11. The system of claim 8 wherein said at least one node is a portable communications device.

12. The system of claim 8 wherein said transmission means is a computer network.

13. The system of claim 8 wherein said transmission means is a cellular network.

14. The system of claim 8 wherein said transmission means is via a radio system.

15. The system of claim 8 further comprising:
    a network, said server located on said network; and
    a plurality of databases on said network, said query means accessing said plurality of databases to retrieve said set of data.

16. The system of claim 15 wherein said application program queries at least one database to determine the identified user's predefined preferences, said application program creating said context sensitive subset of said set of data in response to said predefined preferences.

17. The system of claim 16 wherein said application program queries at least one database to determine the identified user's schedule, said application program creating said context sensitive subset of said set of data in response to the identified user's schedule.

18. The system of claim 17 wherein said application program queries at least one database to determine the identified user's personnel information, said application program creating said context sensitive subset of said set of data in response to the identified user's personnel information.

19. The system of claim 18 wherein said personnel information includes the identified user's job assignment.

20. A storage medium encoded with machine readable program code for providing context sensitive information to a user, said program code including instructions for causing a computer to implement a method comprising:
    identifying a user associated with a business operation;
    defining a query related to the business operation;
    defining an alarm criteria for the query;
    transmitting said query and said user identity to a server;
    periodically querying at least one database;
    retrieving query information from said at least one database;
    retrieving user information from said at least one database;
    obtaining a location of the user within a facility, the location of the user related to the user's duties within the business operation;
    creating a subset of said query information based on said user information and the location of the user within the facility, said query information related to the user's duties within the business operation;
    formatting said subset query information; and,
    transmitting one or more of said formatted subset query information and a notification that an alarm criteria is met to the user.

21. The storage medium of claim 20 wherein said query definition includes data on a desired format of the information.

22. The storage medium of claim 20 wherein said query definition includes data on a desired format of the information.

23. The storage medium of claim 20 wherein said query definition includes information on a period of time between said queries.

24. The storage medium of claim 20 wherein said program code including instructions for causing a computer to implement a method further comprises:
    comparing said query information to said alarm criteria; and,
    notifying said user if said alarm criteria is met based on the comparison.

25. A method of encoding a data signal that is propagated over a propagation medium, the data signal being context sensitive to a particular user, said method comprising:
    identifying a user associated with a business operation;
    defining a query related to the business operation;
    defining an alarm criteria for said query;
    transmitting said query and said user identity to a server;
    periodically querying at least one database;
    retrieving, at least periodically, query information from said at least one database;
    retrieving user information from said at least one database;
    obtaining a location of the user within a facility, the location of the user related to the user's duties within the business operation;
    encoding the data signal with a context sensitive subset of said query information that is based on said user information and the location of the user within the facility, the query information related to the user's duties within the business operation; and
    determining if an alarm criteria is met.

\* \* \* \* \*